United States Patent
Burg et al.

(10) Patent No.: US 8,219,215 B2
(45) Date of Patent: Jul. 10, 2012

(54) ELECTRONIC DEVICE PROPERTIES CONTROL

(75) Inventors: David Burg, Bellevue, WA (US); Vlad Sadovsky, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1066 days.

(21) Appl. No.: 12/125,055

(22) Filed: May 22, 2008

(65) Prior Publication Data
US 2009/0292372 A1    Nov. 26, 2009

(51) Int. Cl.
*G06F 19/00* (2006.01)
(52) U.S. Cl. ............... 700/12; 700/17; 714/30; 382/145
(58) Field of Classification Search ............... 700/11, 700/12, 17; 714/30; 382/145
See application file for complete search history.

(56) References Cited

U.S. PATENT DOCUMENTS

| | | | |
|---|---|---|---|
| 4,731,744 A | 3/1988 | Harrell, Jr. et al. | |
| 5,570,280 A | 10/1996 | Nunnally et al. | |
| 5,768,654 A | 6/1998 | Noguchi et al. | |
| 6,237,112 B1 * | 5/2001 | Yoo et al. | 714/30 |
| 6,300,937 B1 | 10/2001 | Rosenberg | |
| 6,442,508 B1 | 8/2002 | Liao et al. | |
| 6,697,214 B2 * | 2/2004 | Dimitri et al. | 360/97.01 |
| 7,047,293 B2 | 5/2006 | Motoyama et al. | |
| 7,171,582 B2 * | 1/2007 | Henninger | 714/5.1 |
| 2004/0148037 A1 | 7/2004 | Frampton et al. | |
| 2005/0047645 A1 * | 3/2005 | Funk et al. | 382/145 |

FOREIGN PATENT DOCUMENTS
WO    2006095401 A1    9/2006

OTHER PUBLICATIONS

Nunuparov, et al., "Batteryless Locks—Security Devices for Access Control Which Generate Their Own Electricity", http://www.gpi.ru/~martin/asses.htm.
Korhonen, "FPGA based high speed control of a piezo Actuator", Helsinki University of Technology, AS-84.3284 Project in Automation Technology, Mar. 24, 2006, pp. 1-12.

* cited by examiner

*Primary Examiner* — Albert Decady
*Assistant Examiner* — Douglas Lee
(74) *Attorney, Agent, or Firm* — Microsoft Corporation

(57) ABSTRACT

A device with controllable mechanical characteristics makes available a list of controllable characteristics for use by a controller or host computer. The list may include not only controllable characteristics but also the available range for each control, the impact of each adjustment, or both. The host computer can evaluate an operating state of the computer or electronic device and determine how best to set the device for compatible operation with the operating state. When controllable characteristics have multiple effects and/or interact with other controllable characteristics, macros may be developed to perform multiple settings as a group to achieve the desired outcome. The list may also be downloaded from a web service.

16 Claims, 3 Drawing Sheets

ELECTRONIC DEVICE PROPERTIES CONTROL

BACKGROUND

Devices used to support various aspects of computing often have a range of unique properties that can be set to affect performance, response time, temperature, audible noise, power consumption, etc. However, the device rarely has knowledge of its operating context within a system and therefore may simply operate at a nominal factory setting.

Conversely, a computer or other host device may understand the operating context or environment, but rarely has knowledge of what controls and range are available for its various mechanical components.

In some cases, a component, such as a disk drive, may include an application program that a user or administrator can install and use to set performance, such as a sound level for a particular period of time. However, such control requires special knowledge and user intervention to access and use to the application program.

SUMMARY

A device, such a disk drive, may publish or otherwise make available, a list of available settings, their range, and the impact of changing the setting on one or more operational characteristics. The computer or controller to which the device is attached can then evaluate the operating conditions and set the operation of the device accordingly. For example, an optical drive (player/burner) may have a range of speeds and data rates that affect data transfer rates, noise, and power consumption. The optical drive may publish the commands used to control these parameters as well as their available range and impact. A computer to which the optical drive is connected may then be able to evaluate conditions to set the operating environment. If the optical drive is being used to burn a new disk, the performance may be increased at the cost of power consumption and noise. On the other hand, if a movie is being played, the performance of the drive may be set to its lowest usable level to cut noise to a minimum. Other kinds of devices may similarly publish data on their respective controllable characteristics. In other embodiments, the computer may contact a web service to download characteristics that can be controlled, their range, expected effect, and, in some cases, how to program a change.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
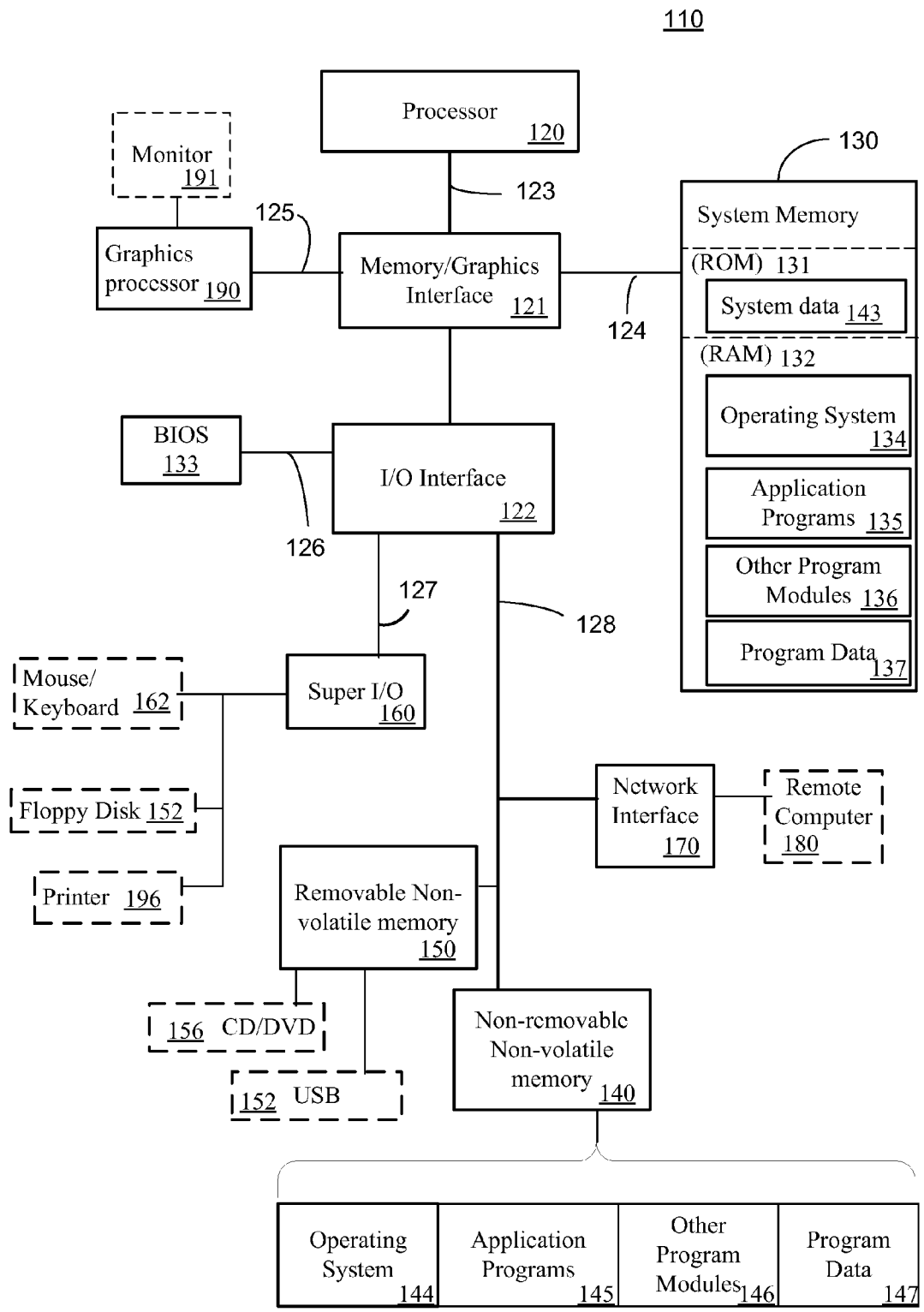
FIG. 1 is a block diagram of a general purpose computing device in communication with one or more devices having externally settable properties.

With reference to FIG. 1, an exemplary system for implementing the claimed method and apparatus includes a general purpose computing device in the form of a computer 110. Components shown in dashed outline are not technically part of the computer 110, but are used to illustrate the exemplary embodiment of FIG. 1. Components of computer 110 may include, but are not limited to, a processor 120, a system memory 130, a memory/graphics interface 121, also known as a Northbridge chip, and an I/O interface 122, also known as a Southbridge chip. The system memory 130 and a graphics processor 190 may be coupled to the memory/graphics interface 121. A monitor 191 or other graphic output device may be coupled to the graphics processor 190.

A series of system busses may couple various system components including a high speed system bus 123 between the processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 123 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport™ architecture, respectively.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data. Combinations of the any of the above should also be included within the scope of computer readable media.

The system memory 130 includes computer storage media in the form of volatile and/or nonvolatile memory such as read only memory (ROM) 131 and random access memory (RAM) 132. The system ROM 131 may contain permanent system data 143, such as identifying and manufacturing information. In some embodiments, a basic input/output system (BIOS) may also be stored in system ROM 131. RAM 132 typically contains data and/or program modules that are immediately accessible to and/or presently being operated on by processor 120. By way of example, and not limitation, FIG. 1 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 126 may connect to a basic input/output system (BIOS) memory 133 containing the basic routines that help to transfer information between elements within computer 110, such as during start-up.

A super input/output chip 160 may be used to connect to a number of 'legacy' peripherals, such as floppy disk 152, keyboard/mouse 162, and printer 196, as examples. The super I/O chip 160 may be connected to the I/O interface 122 with a low pin count (LPC) bus, in some embodiments. Various embodiments of the super I/O chip 160 are widely available in the commercial marketplace.

In one embodiment, bus 128 may be a Peripheral Component Interconnect (PCI) bus, or a variation thereof, may be used to connect higher speed peripherals to the I/O interface 122. A PCI bus may also be known as a Mezzanine bus. Variations of the PCI bus include the Peripheral Component Interconnect-Express (PCI-E) and the Peripheral Component Interconnect—Extended (PCI-X) busses, the former having a serial interface and the latter being a backward compatible parallel interface. In other embodiments, bus 128 may be an advanced technology attachment (ATA) bus, in the form of a serial ATA bus (SATA) or parallel ATA (PATA).

The computer 110 may also include other removable/non-removable, volatile/nonvolatile computer storage media. By way of example only, FIG. 1 illustrates a hard disk drive 140 that reads from or writes to non-removable, nonvolatile magnetic media. Removable media, such as a universal serial bus (USB) memory 153, firewire (1394), or CD/DVD drive 156 may be connected to the PCI bus 128 directly or through an interface 150. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 1, provide storage of computer readable instructions, data structures, program modules and other data for the computer 110. In FIG. 1, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard/mouse 162 or other input device combination. Other input devices (not shown) may include a microphone, joystick, game pad, satellite dish, scanner, or the like. These and other input devices are often connected to the processor 120 through one of the I/O interface busses, such as the SPI 126, the LPC 127, or the PCI 128, but other busses may be used. In some embodiments, other devices may be coupled to parallel ports, infrared interfaces, game ports, and the like (not depicted), via the super I/O chip 160.

The computer 110 may operate in a networked environment using logical connections to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection between the NIC 170 and the remote computer 180 depicted in FIG. 1 may include a local area network (LAN), a wide area network (WAN), or both, but may also include other networks. Such networking environments are commonplace in offices, enterprise-wide computer networks, intranets, and the Internet. The remote computer 180 may host a web service supporting interactive sessions with the computer 110.

In some embodiments, the network interface may use a modem (not depicted) when a broadband connection is not available or is not used. It will be appreciated that the network connection shown is exemplary and other means of establishing a communications link between the computers may be used.

Figure 2:
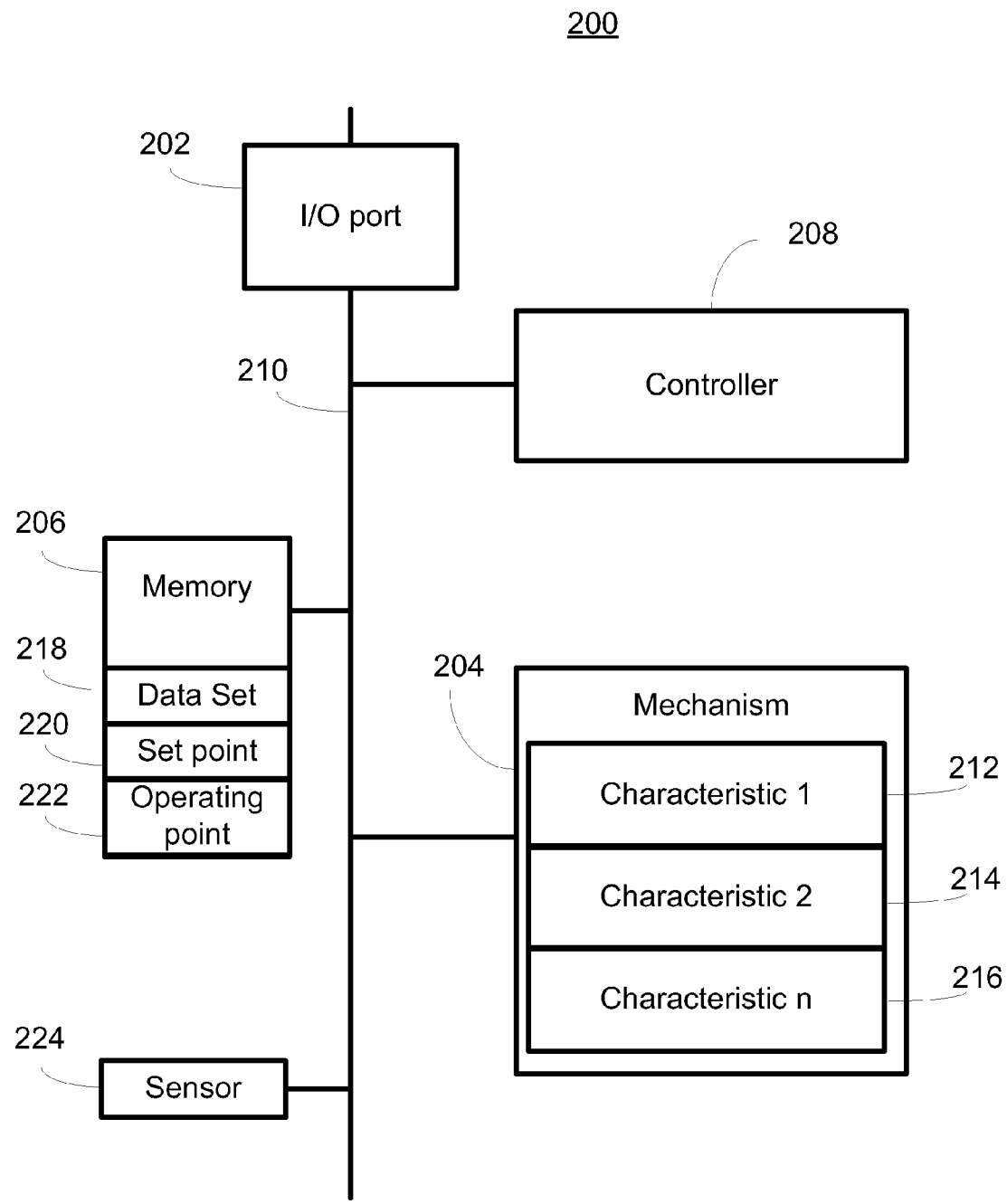
FIG. 2 is a block diagram of an exemplary device supporting properties control.

FIG. 2 is block diagram of a device 200 arranged and adapted for device control. The device 200 may support one or more functions, such as data storage, data communication, information display, etc. In various embodiments, the device 200 could be or include traditional "peripheral" devices, such as disk drives, but may also include other components, such as memories, bus controllers, or Northbridge/Southbridge-type chips. In the case of a memory, some controllable properties may include clock speed, refresh rates, voltage, etc. A bus controller may be controlled to manage clock speeds, power consumption, error correction/control.

The device 200 may include an input/output port 202 that supports bi-directional communication between the device 200 and an control entity (for example, an I/O interface 122, or super I/O 160 of FIG. 1) that provides an operating environment for the device, such as a computer similar to computer 110 of FIG. 1. The device 200 may also have one or more mechanisms 204, a memory 206, a controller 208, and a bus 210. The I/O interface 202 may support an industry standard protocol. For example, a hard disk drive may support an IDE interface, an ATA interface, variations of those (e.g. SATA), or others. By supporting industry standard protocols, the device 200 may implement device control, as described, and still maintain backwards compatibility with those standards. Because the new functions are extensions of existing standards, they may be incorporated in future versions of the standards without impacting compatibility with current or prior versions.

The mechanism 204 may be related to the designated function of the device and may have one or more characteristics that are controllable over a range of settings. For example, the device 200 may be a hard disk drive, either internal or external, an optical disk drive, a display, etc., in which case the mechanism may include elements such as motors for disk rotation and head motion, back lighting, or bias currents. Each of these elements may have one or more characteristics 212, 214, 216 controllable over a range of settings. For example, motors may allow setting rotation speed, heads may allow controlling seek patterns and rates, displays may allow setting backlight levels, display timeout periods, or bias levels. Note that some elements are mechanical, such as motors, while other are not, such as backlight levels. Other embodiments may not include mechanical components, as such, but may have controllable settings that affect performance, such as memory response times.

The memory 206 may include both volatile and non-volatile memory. The memory 206 may include executable instructions for the controller 208 as well as to provide data buffering, as needed, for I/O port traffic. The memory 206 may also include data related to the characteristics 212, 214, 216 of the mechanism 204. In one embodiment, the memory 206 may include a data set 218, a set point 220, and an operating point 222. The data set 218 may include a description of each of the characteristics 212, 214, 216, a range of operation for each, and, optionally, an impact for each. Table 1 illustrates an exemplary data set for a hard disk drive disk rotation characteristic. The actual data as stored may be in a defined, compressed form.

TABLE 1

| Disk rotation rpm | Latency - ms | Noise - Bel | Power r/w - W |
|---|---|---|---|
| 3500 | 6.5 | 1.8 | 1.8 |
| 4500 | 5.0 | 2.2 | 2.0 |
| 5500 | 4.5 | 2.6 | 2.3 |

Similar data for other characteristics may also be stored in the data set 218. In another embodiment, a characteristic may be described parametrically. For example, disk power consumption may be expressed as proportional to a cube of rotation speed, with a given starting speed and power consumption.

Adjusting a single characteristic may have an effect in more than one area. For example, in Table 1, disk rotation speed impacts latency, noise, and power consumption. Recognizing that, the data set 218 may also include macros, or pre-determined settings for optimizing to a desired operating condition. The control entity may read the macros and use them as is, or edit them in view of a slightly different operating condition. For example, a macro for low power operation of a disk drive may include combined settings for disk speed, head seek mode, cache size, and disk braking. The macros may be retrieved from the device itself, from a web service, or may be stored on the computer, for example, during an installation procedure. In one embodiment, the macro may be specific to a particular model of device, or even to a particular firmware load. In other embodiments, macros may be applicable to a class of devices.

In other embodiments, the data set 218 may be minimal and contain, for example, only a universal record locator (URL) and model number. Using those two pieces of information, (or optionally, manufacturer, model, serial number, firmware revision, etc.) a control entity may contact a web service, such as a web service supported on remote computer 180 of FIG. 1. to access device data and other information relevant to the mechanism 204. While in contact with the web service, downloads may be performed of characteristic data, macros, characteristics tables (e.g. Table 1) or other related information, such as a current firmware version. In some embodiments, downloads may be signed by a private key of the web service and verified by a public key stored in the mechanism or trusted via a third party certificate.

The set point 220 may be written to by the control entity to request operation of a characteristic at a point in the range or at one selection of a number of discrete set points.

The operating point 222 may reflect an actual operating state. The operating point 222 may be read by the control entity to determine whether a change in set point 220 is required or whether a requested change has been implemented.

The controller 208 may manage operation of the device 200. The controller 208 may be a dedicated processor, a single chip embedded controller, ARM® processor, application specific integrated circuit, or the like. The controller 208 may direct operation of the device 200 including management of I/O activities, reading the set point 220 and adjusting appropriate controls (not depicted) to implement the set point 220, as well as determining operational data to write operating point data.

A bus 210 may connect the I/O port 202, mechanism 204, memory 206, and controller 208. The bus 210 may be one of the known bus structures discussed with respect to FIG. 1.

An optional sensor 224 may be used to collect signals for measurement of actual conditions, such as temperature, noise, etc. The sensor 224 may report measurement data via the memory 206 or may be directly addressable via the I/O port. The data from the sensor 224 may be polled by the control entity or may be reported. Reporting may be on a regular interval or may be reported when a change in readings reaches a threshold value.

In other applications, the sensor 224 may be external to the device 200 and may be used to measure an effect as experienced by a user, for example, disk drive noise as measured outside a computer in which the drive is operating.

In yet another embodiment, data from both internal and external sensors may be aggregated and correlated to provide a measure of impact of internal changes on the external environment.

In one embodiment, the sensor measurements may be reported to a web service that aggregates information from a number of reporting devices to optimize data set 218 information and macros based not on lab results but actual field data. Because conditions external to the device may affect some measurements, data may be taken over a extensive period before being aggregated or reported to the web service. For example, removable media, such as DVDs may cause different noise levels even though they are operated at the same speed due to physical imbalances or scratches that cause extensive head seeking.

In a related embodiment, human interaction may be recorded and forwarded to a web service in place of sensor data. For example, a user may be presented with a slider that allows control of disk speed. When the noise level is acceptable, the speed setting may be recorded for later use, but also forwarded to the web service for comparison with other reported measurements. Such aggregated results may be used to develop macros that are generally applicable across broad ranges of user environments.

In various embodiments, the device 200 may be or may include traditional "peripheral" devices, such as disk drives, such as described above, but may also include other components, such as memories, bus controllers, processors, or Northbridge/Southbridge-type chips. In the case of a memory, some controllable properties may include clock speed, refresh rates, voltage, etc. A bus controller may be controlled to manage clock speeds, power consumption, error correction/control. In these cases, the architectures may vary slightly from that described above in terms of ports or memory arrangements, but the techniques for control are equally applicable. Particularly in the case of system chip sets, e.g. a Northbridge or equivalent, the use of macros and a web service for interface are particularly valuable, as the complexity of not only the chips, but access and control are well beyond the capability (or interest level) of an average user.

Figure 3:
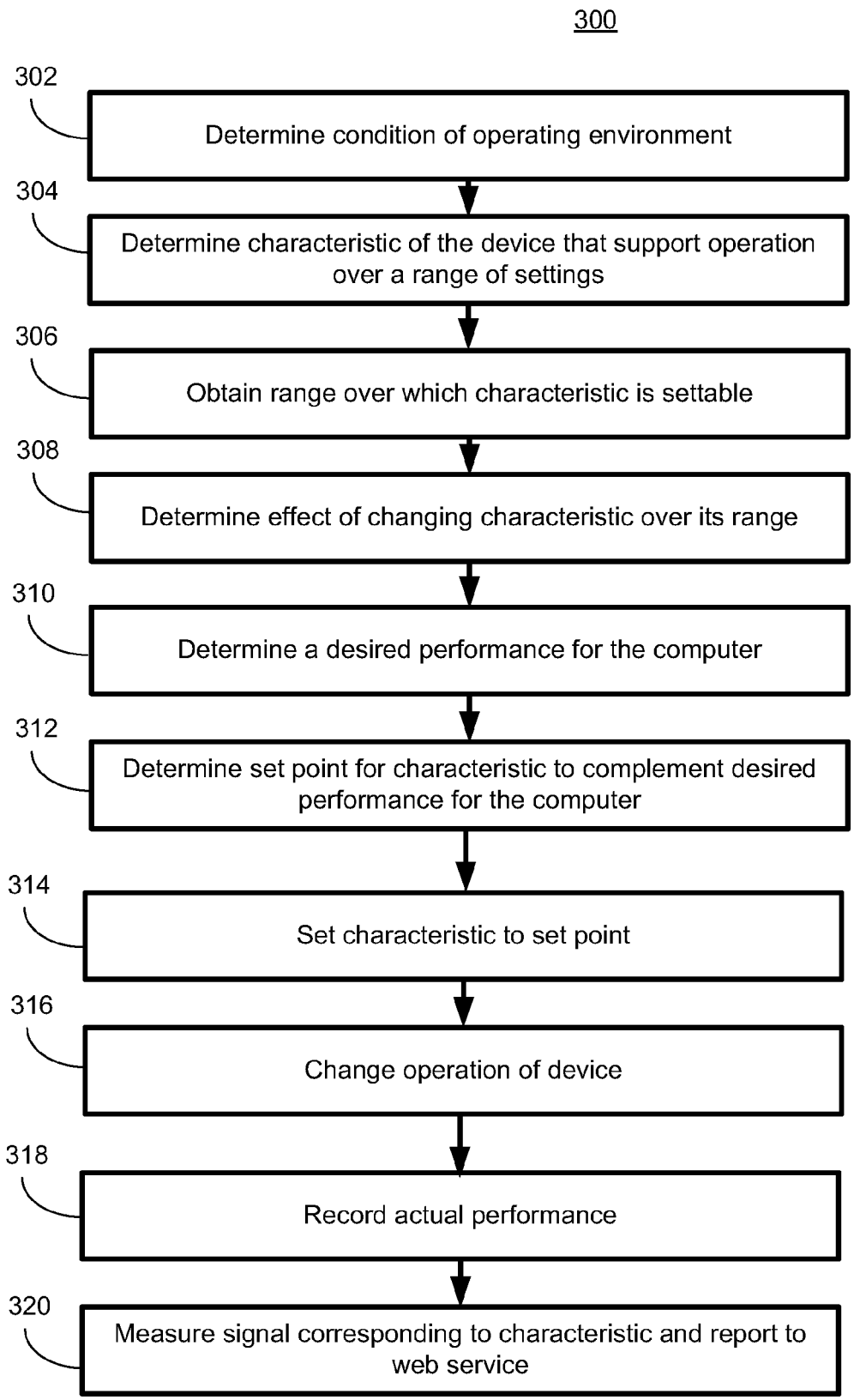
FIG. 3 is a flow chart of a method of determining and setting device property controls.

FIG. 3 is a method 200 of controlling settable characteristics of a device, such as the device 200 of FIG. 2. At block 302, a computer 110 or other entity controlling the device 200 may determine a condition of its operating environment. For example, the computer 110 may be aware of the context of its operation, whether compiling a software program, operating on battery power, playing a video from optical media, etc.

At block 304, the computer 110 may determine characteristics of the device that support operation over a range of settings. This may happen in a number of ways. In one embodiment, the computer 110 may determine the characteristics of the device 200 by obtaining the characteristics of the device 200 by reading the information, such as a data set 218, from a memory 206 of the device 200. In a similar embodiment, the device 200 may perform an automatic upload of its characteristics while the device 200 is being initialized or installed into the computer 110.

In another embodiment, the characteristics may be obtained from a web service, responsive to a request for the information. For example, the computer 110 may query the device 200 and receive model information, and in some cases, a URL of the web service. After contacting the web service, determining the characteristics of the device comprises receiving the characteristics of the device from the device responsive to a query requesting the characteristics.

The characteristics obtained about the device 200 may include what controls are available, how to set them, over what range the characteristic may be adjusted, and an effect associated with an adjustment over the range. For example, in a hard disk drive 140, controls may be available for disk speed, head seek pattern, disk braking speed, error correction mode, and cache size. The information provided by the device 200 may also include how the settings may be made, for example, by providing a memory map of register locations. The range and effect can be communicated in the fashion of Table 1, using an agreed upon notation convention.

At block 308, the computer 110 may determine a desired performance for itself. As discussed above, when performing data processing, speed, or in the case of a disk drive, latency may be the most important factor to be optimized for. When watching a movie, noise level may be important and when on battery power, current drain may be most important. For example, to minimize noise, disk speed may be reduced and head seek mode may be set to continuous, or to optimize battery life, the length of time over which an optical disk is slowed before ejecting can effect current drain. When the computer has determined what mode it is operating in, and therefore, what performance is desired, execution may continue at block 312.

At block 312, the computer may examine the available characteristics for adjustment and determine a set point for the characteristic corresponding to the desired performance for the computer 110. That is, using the available characteristics, their range and effect, the computer 110 can determine what characteristics to set to achieve the desired performance.

At block 314, the computer 110 may then set the device 200 to operate in the desired mode. When available, the computer 110 may query the device 200 prior to making any settings to confirm its current settings to determine if a change is required. When required, the computer 110 may update the settings of the device 200 to reflect the desired performance. Obviously, when more than one device has settable characteristics, the computer 110 may update settings for all appropriate devices to the mode determined to best support the desired performance. For example, to optimize power, in addition to disk drive settings, a monitor may be set to a low backlight, a keyboard scan rate may be reduced, etc.

As discussed above, in some cases, a macro may be available to the computer 110 that sets all appropriate settings in a batch, to coordinate optimal operation to support a particular operation mode, such as low power, quiet operation, or maximum performance.

At block 316, after the device settings have been updated, the settings may be activated to change the operation of the device to its new mode. In one embodiment, the group of settings may be developed on the computer 110, while another embodiment may download the group of settings (or macro) from a web service. When downloaded from a web service, the group of settings may be categorized on the web service by the impact of applying the group. For example, the group of settings may simply be identified as, "low power," "low noise," or "high performance."

At block 318, the computer 110 may measure the actual performance associated with a setting or group of settings. In some cases, the computer 110 may be able to measure the actual performance directly, for example, data latency. In other cases, a sensor 224 may be required to measure a signal corresponding to performance, such as noise, vibration, current drain, etc. For example, a sensor 224 such as a microphone may be mounted internally to the computer 110 to measure a change in noise. However, this may not reflect the impact on a user. So, in some cases, a sensor 224 may be mounted external to the computer 110 so that a measurement reflecting a user's perception of performance may be recorded. The measured performance may be recorded and included in a the data set 218 of the device 200 or stored on the computer 110. Such information may be used to fine tune settings, or to adjust the "effect" data reported so that tradeoffs between settings can be evaluated.

At block 320, the data collected at block 318, including set points and measured values may be reported to the web service, so that the measured impact from computer 110 may be combined with that from other computers (not depicted) to allow similar fine tuning and tradeoffs to be evaluated on a broader scale and to be reported to a potentially large number of users with similar devices or computers.

The ability to directly determine, either from a device or from a web service, the characteristics of a device that can be set, their range and expected effect gives a computer a new level of ability to adjust its own operation to optimize around its desired performance. Even though some devices allow such adjustments, they require user intervention that often involves reading a manual and directly manipulating a setting. Most users will not take the time to perform such settings and even more rarely will they adjust them as operation changes. Other pre-set operating modes, such as power management, are simply managed by the operating system and BIOS without specific knowledge from the device on what the full range of its settings may be. A computer using the devices and techniques disclosed above can offer its user a more robust and satisfying computing experience even when new devices are introduced into the computer. The user can realize the benefits from adjustable performance without direct intervention, or in some cases, without even the knowledge that it is taking place.

In one embodiment, the control entity, for example, a computer operating system may observe changes in settings and develop heuristics for coordinating settings to operational conditions. For example, when settings associated with low noise are routine made when playing a video, a user may be offered those settings when a movie is started. Alternatively, the settings may be automatically made the observed conditions are met, such as the movie starting.

Although the foregoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A method of controlling a settable characteristic of a device operating in a computer, comprising:
   determining characteristics of the device that support operation over a set of settings;
   obtaining at least one set point among the set of settings of the characteristic;
   determining a desired performance for the computer; and
   for respective characteristics:
      obtaining from a service at least one expected effect of respective set points of the characteristic of the device; and
      based on the expected effects of respective set points of the characteristic obtained from the service, determining a selected set point for the characteristic corresponding to the desired performance for the computer; and
      setting the characteristic to the selected set point.

2. The method of claim 1, wherein determining the characteristics of the device comprises receiving an automated upload of the characteristics from the device during an initialization phase.

3. The method of claim 1, wherein determining the characteristics of the device comprises receiving the characteristics of the device from the device responsive to a query requesting the characteristics.

4. The method of claim 1, wherein setting the characteristic to the set point comprises setting a combination of the characteristics as a group coordinated to correspond to the desired performance.

5. The method of claim 4, wherein setting the combination of the characteristics as a set comprises downloading the group from a service.

6. The method of claim 5, wherein downloading the set from the service comprises identifying the set according to a performance impact of applying the set.

7. The method of claim 1, wherein setting the characteristic comprises setting the characteristic to affect noise.

8. The method of claim 1, wherein setting the characteristic comprises setting the characteristic to affect response time.

9. The method of claim 1, wherein setting the characteristic comprises setting the characteristic to affect power consumption.

10. The method of claim 1, further comprising reporting a current setting for the characteristic.

11. The method of claim 1, obtaining from the service the expected effects of respective set points of the characteristic comprising:
   obtaining model information from the device;
   sending a request to the service using the model information; and
   receiving from the service data corresponding to the expected effects of respective set points of respective characteristics of the device.

12. The method of claim 1, comprising: after setting the characteristic to the selected set point:
   detecting the performance of the device during the operation;
   identifying at least one effect associated with the performance; and
   for respective selected set points of respective characteristics of the device, storing the effect as an expected effect of the selected set point of the characteristic of the device.

13. The method of claim 12:
   the computer having at least one sensor associated with the device; and
   detecting the performance comprising: receiving data from at least one sensor during the operation of the device.

14. The method of claim 12, comprising: reporting the expected effects of respective selected set points of respective characteristics of the device to a service configured to store the expected effects of respective set points of respective characteristics of the device.

15. A method of setting performance of a device for compatible operation within its operating environment comprising:
   determining a condition of the operating environment;
   determining a range of operation for the device;
   obtaining from a service at least one expected effect of respective settings within the range of operation of the device;
   based on the expected effects of respective settings, selecting an operating point for the device by comparing the condition of the operating environment with the expected effect for the setting; and
   setting the operating point for the device.

16. The method of claim 15, wherein determining the range of operation of the device and determining the expected effect for a setting comprises:
   obtaining model information from the device;
   sending a request to a web service using the model information; and
   receiving data corresponding to the range of operation and the expected effect from the web service.

* * * * *